UNITED STATES PATENT OFFICE.

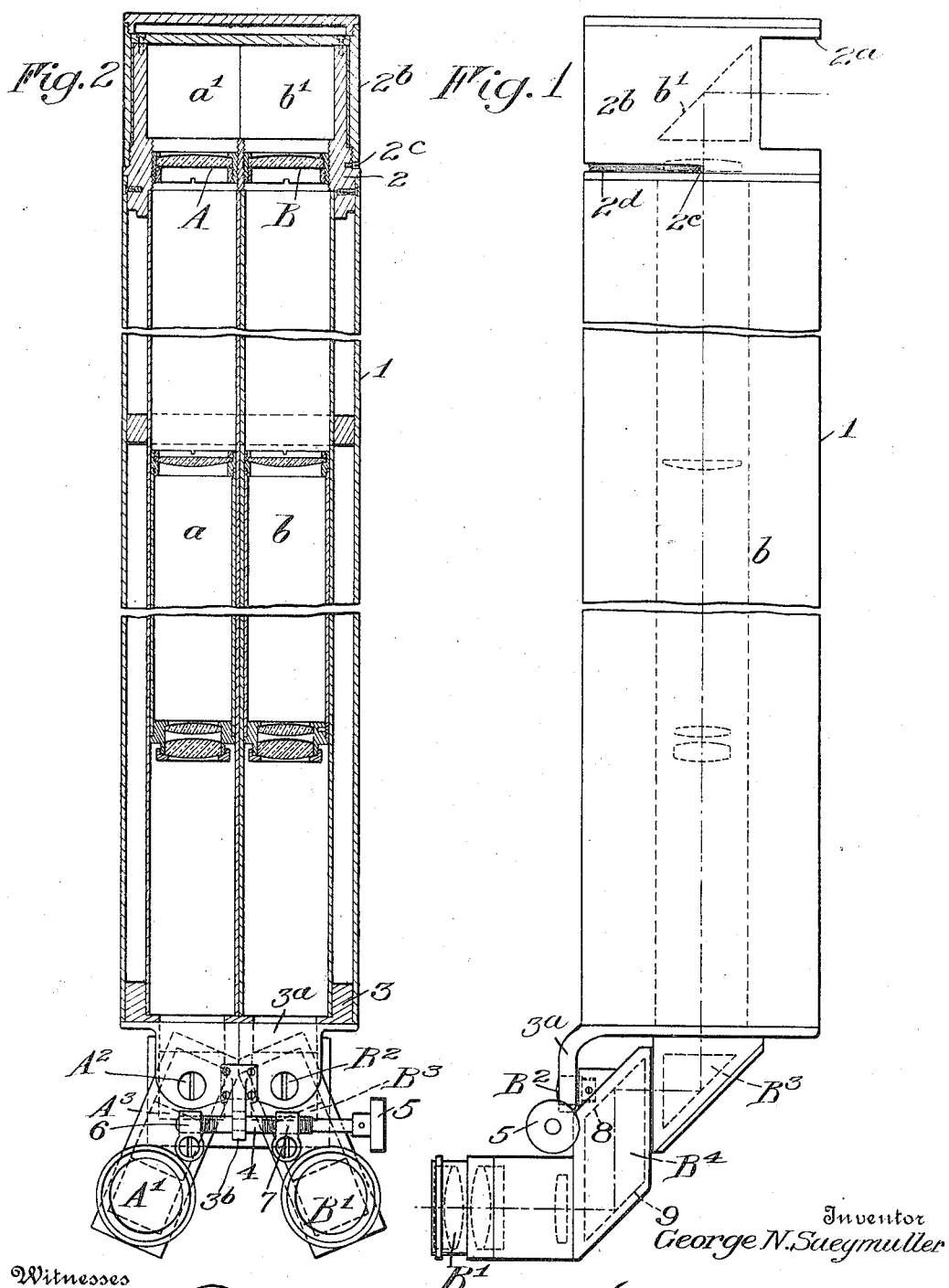

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

BINOCULAR PERISCOPE.

1,153,259.            Specification of Letters Patent.      Patented Sept. 14, 1915.

Application filed December 5, 1913. Serial No. 804,931.

*To all whom it may concern:*

Be it known that I, GEORGE N. SAEGMULLER, of Rochester, in the county of Monroe and State of New York, have invented certain new and useful Improvements in Binocular Periscopes; and I do hereby declare the following to be a full, clear, and exact description of the same, reference being had to the accompanying drawings, forming a part of this specification, and to the reference numerals marked thereon.

My present invention relates to optical instruments and has for its object to provide a periscope adapted for binocular vision and in an instrument of this character my invention has for its further object to provide means for adjusting the pupilary distance between the eyepieces to accommodate different users of the instrument.

To these and other ends the invention consists in certain improvements and combinations of parts, all as will be hereinafter more fully described, the novel features being pointed out in the claim at the end of the specification.

In the drawings: Figure 1 is a side elevation of an optical instrument illustrating one embodiment of my invention, and Fig. 2 is a vertical cross sectional view taken through the body of the instrument and showing the eyepiece mounting in elevation.

Similar reference numerals throughout the several figures indicate the same parts.

My invention, generally stated, consists in providing an optical instrument adapted to be used particularly as a periscope and the provision therein of means whereby a binocular view may be had.

In carrying out my invention I mount in the periscope tube two systems of lenses having eyepieces or oculars which are relatively adjustable toward and from each other to accommodate the pupilary distance of the different persons who may make observations with the instrument.

In illustrating my invention I have shown a periscope tube or casing 1 in which are located side by side and parallel to each other, the two systems of lenses, which, in the present instance, comprise the objectives A and B and their respective erecting components $a$ and $b$. These parts are secured in their proper position of adjustment by any suitable form of mounting, the details of which are, therefore, omitted from this description, with the exception of calling attention to the upper and lower heads 2 and 3 on the tube 1. The former carries the reflectors by which the horizontal light rays are directed into the lens systems and the latter forms a support for the adjustable oculars and the reflectors by means of which the light rays emitted from said lens systems are directed into their respective eyepieces. The head 2 carries the two reflecting surfaces preferably in the form of prisms $a'$, $b'$ having the inclined surfaces arranged in alinement with the objectives A and B and the opening $2^a$ in the forward side of said head. If desired this opening may be closed when the instrument is not in use by a revoluble cap $2^b$, the rotary motion of which is limited by the pin or screw $2^c$ operating in the slot $2^d$.

It will be noticed that the distance between the axes of the two lens systems A, B is very much less than the normal pupilary distance of users of the instrument and because of the high magnifying power of these instruments and the necessity for accuracy in their use it is very essential that means be provided whereby even slight differences in the pupilary distances of different observers can be accommodated and to this end I mount the oculars $A'$ and $B'$ on pivots $A^2$, and $B^2$ on a depending arm $3^a$ at the rear edge of the lower head 3. The adjustment of the eyepieces relatively to each other is effected by a rod 4 having right and left hand screw threads and rotatable by the finger wheel 5. The screw rod is carried in a depending bracket $3^b$ and coöperates with the nuts 6 and 7 on the frames or carriers supporting the two eyepieces.

The axes of the lens systems comprising the objective portion of the telescope extend in one plane, that is the vertical plane, and the axes of the eyepieces or oculars extend in a plane at an angle to the axes of the other lenses which, in the present instance, is the horizontal plane. In order to permit the relative adjustment of the eyepieces in the manner before referred to, the pencils of light rays from the vertical lens systems are deflected laterally by reflecting surfaces, preferably formed by the prisms $A^3$ and $B^3$, (both shown in dotted lines in Fig. 2 and one similarly illustrated in Fig. 1) and the frames or carriers, on which the respective eyepieces are mounted, rotate on journals which are coincident with the axes of the reflected light rays. The eyepieces are offset from their journals and movable with each, and mounted rigidly in respect thereto, are two parallel reflecting surfaces, as indicated by 8 and 9 in Fig. 1. These surfaces are in alinement with each other, the former occupying a central position relatively to the pivotal center and to the axis of the reflected light rays, while the latter is similarly disposed in the axis of the ocular.

If it is so desired, and in practice I deem it preferable to do so, rhomboid prisms, as indicated by $B^4$, may be employed in front of each eyepiece to provide the reflecting surfaces 8 and 9.

I claim as my invention:

In a binocular periscope, the combination with a periscope tube, two systems of lenses mounted therein side by side and reflectors at the lower ends of said systems, of adjustable oculars for the lens systems, both mounted on one end of said tube and offset from the path of the light rays deflected by the reflectors and other reflectors coöperating with the oculars and said first mentioned reflectors.

GEORGE N. SAEGMULLER.

Witnesses:
WILLIAM G. WOODWORTH,
HENRY C. THON.